United States Patent

Reschke et al.

[15] 3,659,574

[45] May 2, 1972

[54] NATURAL GAS POWERED ENGINE

[72] Inventors: Albert H. Reschke, Chagrin Falls; James E. Dick, Hudson; Orrin E. Bose, North Canton, all of Ohio

[73] Assignee: The East Ohio Gas Company, Cleveland, Ohio

[22] Filed: Apr. 13, 1970

[21] Appl. No.: 27,781

[52] U.S. Cl. ............................................................... 123/121
[51] Int. Cl. ........................................................... F02m 13/08
[58] Field of Search .................................................. 123/121

[56] References Cited

UNITED STATES PATENTS 2,381,304  8/1945  Merrill .................................. 123/121

FOREIGN PATENTS OR APPLICATIONS 872,130  3/1953  Germany ............................... 123/121
112,482  11/1944  Sweden .................................. 123/121
67,779  8/1942  Norway .................................. 123/121

Primary Examiner—Wendell E. Burns
Attorney—Fay, Sharpe & Mulholland

[57] ABSTRACT

A dual fuel feed apparatus and control for an internal combustion engine adapted to be powered by both natural gas and gasoline. A pair of carburetors are mounted in parallel at the intake manifold. A single throttle control is provided with a switch such that operation of the engine on either natural gas or gasoline may be selected by the operator at his option.

12 Claims, 4 Drawing Figures

INVENTORS.
ALBERT H. RESCHKE
JAMES E. DICK &
BY ORRIN E. BOSE

*Fay, Sharpe & Mulholland*
ATTORNEYS

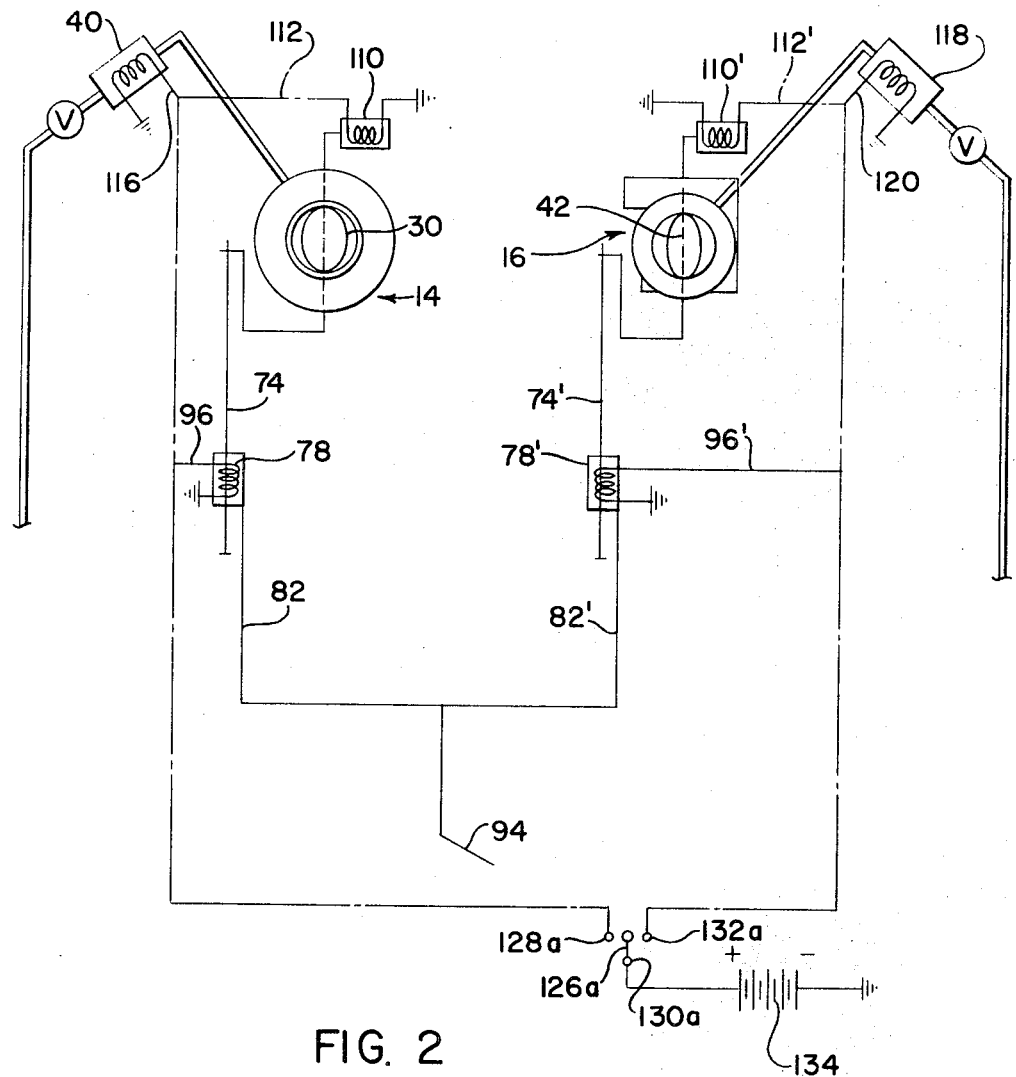
FIG. 2
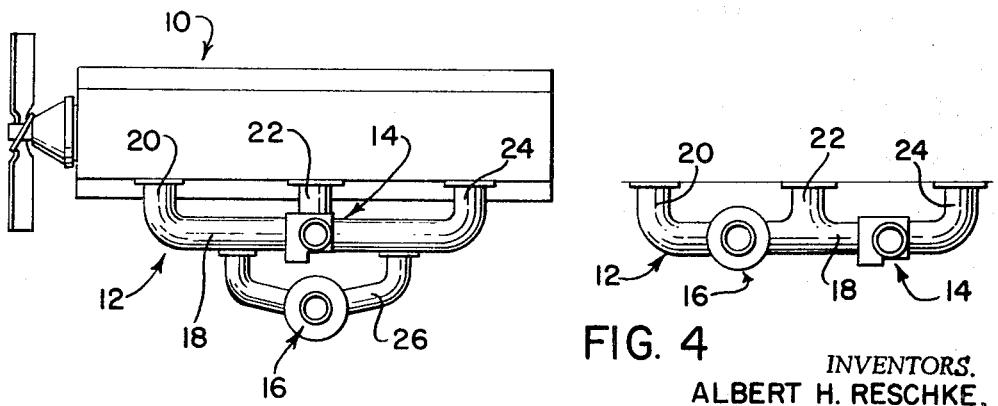
FIG. 3
FIG. 4
INVENTORS.
ALBERT H. RESCHKE,
JAMES E. DICK &
ORRIN E. BOSE
BY *Fay, Sharpe & Mulholland*
ATTORNEYS

NATURAL GAS POWERED ENGINE

BACKGROUND OF THE INVENTION

This invention relates to a natural gas powered internal combustion engine and more particularly to a dual fuel feed apparatus and control for an internal combustion engine adapted to be powered by either natural gas or gasoline. This invention provides control means by which the dual fuel feed can be switched from gasoline to natural gas or vice versa at the option of the operator. Stated another way, this invention provides for interchangeable use of gasoline and natural gas in an internal combustion engine.

The air pollution problems inherent in the operation of a gasoline powered internal combustion engine are well known. Various emission control devices have been proposed for gasoline powered internal combustion engines which serve to reduce the amount of pollution placed in the atmosphere by the engine. These control devices are not entirely satisfactory, however, since the nature of the gasoline combustion process itself inherently produces combustion products which cannot be completely recovered.

More recently, the use of natural gas as a fuel for internal combustion engines has been proposed. The natural gas combustion process, it has been found, produces a lower volume of contaminate emission as compared to gasoline. Natural gas further decreases the operating cost of the engine as compared to gasoline.

The use of natural gas as a fuel for internal combustion engines is not of itself a new concept. Pipeline compressor engines have operated for years on natural gas. This fuel has also been used by oil field operators, farmers, and water districts to power engines.

The first step in the development of a natural gas powered internal combustion engine has been the use of a dual fuel system providing for both gasoline and natural gas fuel feed to the engine on an interchangeable basis. In a motor vehicle equipped with a dual fuel system, clean burning natural gas is normally used instead of gasoline where the vehicle is apt to be a pollution offender such as where the vehicle is to be operated in urban areas or where the driving is of a "stop and go" nature. Likewise, in a motor vehicle equipped with a dual fuel system, gasoline is normally used where the vehicle is driven in areas where pollution is less of a problem such as in suburban areas or where the vehicle is used for long distance driving.

The use of a dual fuel system is not in and of itself a new development. This system has taken various forms, however, as has been observed in recent literature.

One form of a dual fuel system utilizes a single carburetor with the feed of natural gas or gasoline provided through the carburetor.

In another form of a dual fuel system a pair of carburetors have been used with the natural gas carburetor mounted in series with the gasoline carburetor providing for the flow of natural gas from the natural gas carburetor through the gasoline carburetor.

There are several disadvantages inherent in the prior art dual fuel systems described above. Where a single carburetor is used for both gasoline and natural gas it is not possible to effect an immediate transition from one fuel to the other with the vehicle in operation. Furthermore, the use of a single carburetor for both fuels makes it virtually impossible to adjust carburetion for optimum operation of the engine on either one of the fuels when used alone. The single carburetor of a one carburetor dual fuel system must be adjusted in a manner to achieve a setting common to both gasoline and natural gas. This single setting sacrifices performance of the fuels.

In dual fuel systems where a pair of carburetors have been used in series with the flow of fuel from the natural gas carburetor being diverted through the gasoline carburetor, it is not possible to effect an immediate transition from one to the other fuel with the vehicle in operation. A further drawback to series mounted carburetors is that starting and maintenance of operation of the vehicle on either fuel system through the entire operating range of the engine is not possible.

BRIEF SUMMARY OF THE INVENTION

Briefly described, this invention provides for a dual fuel feed apparatus and control for an internal combustion engine comprising a pair of carburetors mounted in parallel on the engine intake manifold permitting independent carburetion and feed of either gasoline or natural gas to the engine at the option of the operator. A single throttle control and selector switch are provided. The throttle control may, by means of solenoids energized by the selector switch, move the throttle plate or either one of the carburetors at the option of the operator. Depending upon the switch position, the selector may also place either one of the throttle plates of a respective carburetor in an idle position while opening the fuel supply to that carburetor at the option of the operator. The throttle plates of the carburetors are normally closed unless activated by the selector switch. In the closed position the respective throttle plates act as tight sealing valves to prevent air flow through the respective carburetors.

BRIEF DESCRIPTION OF THE DRAWING

FIG. 2 is a schematic diagram of the electrical circuitry and mechanical linkage of the dual fuel feed apparatus and control of this invention;

FIG. 3 is an elevational view of an internal combustion engine and showing a pair of carburetors mounted in parallel in side-by-side configuration on the engine intake manifold in a manner taught by the preferred embodiment of this invention; and FIG. 4 is an elevational view of a modification of the intake manifold of this invention and showing the carburetors mounted in forward-to-rear configuration.

DESCRIPTION OF THE INVENTION

Figure 1:
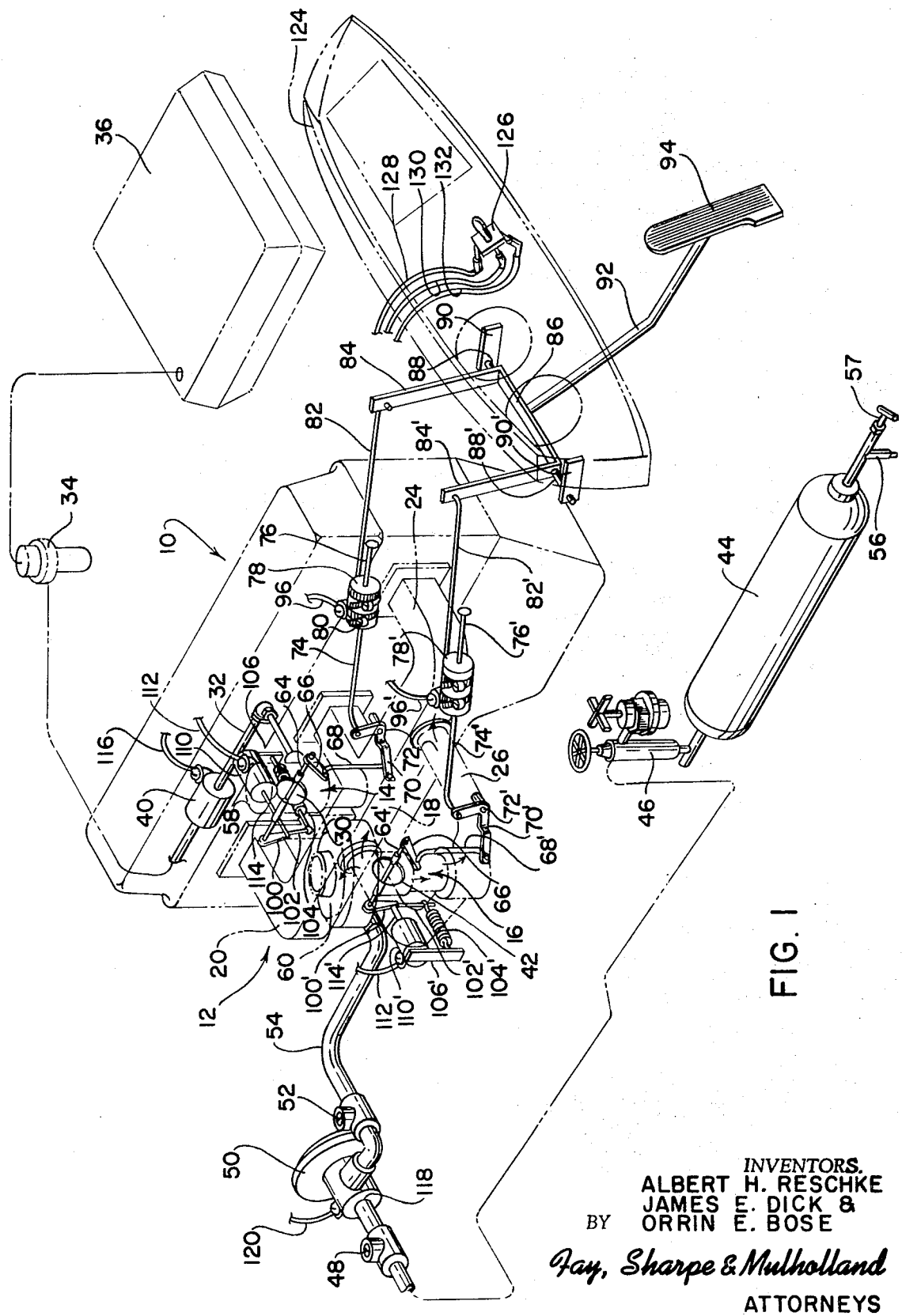
FIG. 1 is a schematic view of the dual fuel feed apparatus and control of this invention.

Turning now to FIG. 1, there is shown in schematic form an internal combustion engine 10 having an intake manifold 12 and a pair of carburetors 14, 16 mounted in parallel thereon. The internal combustion engine 10 is a standard six cylinder in-line engine. Within the spirit of this invention should also be considered other engine types such as V-6 and V-8 engines and opposed four, six and eight cylinder engines.

The intake manifold 12, in the preferred embodiment of the invention, includes a tubular main body 18 and tubular branches 20, 22 and 24 leading to the intake ports of the engine cylinders. A tubular mainfold extension 26 projects from the main body 18 for the purpose of mounting carburetor 16 in parallel relationship to carburetors 14 in a side-by-side configuration. The parallel mounting relationship of carburetors 14, 16 on the intake manifold 12 in the preferred embodiment may be clearly seen in FIG. 3.

The fuel-air mixture from carburetor 14 is fed to the engine by means of the tubular main body 18 and the tubular branches 20, 22 and 24 of the intake manifold 12. The fuel-air mixture of carburetor 16 enters the tubular main body 18 by means of the tubular manifold extension 26. The fuel-air mixture from either of the carburetors 14, 16 is thus independently fed to the engine. Stated another way, the fuel-air mixture from either of the carburetors 14, 16 is fed directly to the intake ports of the engine cylinders without passing through the other of the carburetors.

In an alternate embodiment of the manifold as is shown in FIG. 4 the carburetors 14, 16 may be mounted in parallel in a forward-to-rear configuration directly on the tubular main body 18 without the necessity of providing a tubular manifold extension.

In either mounting configuration as shown in FIGS. 3 and 4, the fuel-air mixture from a respective carburetor is fed directly to the intake ports of the engine without passing through the other of the carburetors.

Other carburetors mounting configurations well known to those skilled in the art should be considered within the scope of this invention.

Carburetor 14 is a gasoline carburetor and functions to mix gasoline and air in a prescribed ratio prior to the introduction of the mixture into the internal combustion engine 10. The flow rate of the gasoline-air mixture from the carburetor 14 to the intake mainfold 12 is regulated by means of throttle plate 30. Throttle plate 30 is normally biased to a closed position as will be described more fully hereafter. While closed, the throttle plate acts as a tight sealing valve to prevent air flow through the carburetor. The mechanism providing for the control of the throttle plate 30 will be described more fully hereafter.

Gasoline is pumped to carburetor 14 by means of a fuel pump 34. An intake line 32 extends from the fuel pump 34 to carburetor 14. Gasoline, in turn, is supplied to fuel pump 34 by means of tank 36. Tank 36 will normally be positioned in any convenient location of the vehicle and may vary in size depending upon the gasoline requirements of the vehicle.

Tank 36 and fuel pump 34 are shown schematically in FIG. 1 in order to simplify the description of the invention. It should be understood that fuel lines interconnecting the tank 36 to the fuel pump 34 and the carburetor 14 provide for the flow of gasoline from the tank to the carburetor.

The carburetor 14 (exclusive of the control mechanism for the throttle plate 30), the intake line 32, the fuel pump 34, and the tank 36 are well known to those skilled in the art. The particular structures of these components just noted do not comprise any part of this invention and a further description of them is believed to be unnecessary.

A solenoid operated shut-off valve 40 is provided in the gasoline intake line 32 in order to interrupt the flow of gasoline from the fuel pump 34 to the carburetor 14 when it is desired to operate the internal combustion engine 10 on natural gas fuel. An electrical lead 116 extends from the solenoid body and is adapted to be interconnected into the electrical system of the vehicle as will be described more fully with reference to FIG. 2. For ease of description, much of the electrical wiring of the system of this invention has been omitted from FIG. 1.

The solenoid operated shut-off valve 40 is a standard shut-off valve well known to those skilled in the art. The particular structure of the valve does not comprise any part of this invention and a further description of it is believed to be unnecessary.

The shut-off valve 40 is of a type that will open the flow of gasoline to the carburetor when the solenoid is energized and correspondingly will shut-off the flow of gasoline when the solenoid is deenergized. A further description of the operation of the solenoid will be made hereafter.

Mounted on the manifold tubular extension 26 as shown in FIG. 3 is carburetor 16. Carburetor 16 is basically a natural gas-air mixer and includes a throttle plate 42 for the purpose of metering the flow of the natural gas-air mixture from the carburetor to the intake manifold. Throttle plate 42 is normally biased to a closed position as will be described more fully hereafter. While closed, the throttle plate acts as a tight sealing valve to prevent air flow through the carburetor. The mechanism providing for the control of the throttle plate 42 will be described more fully hereafter.

Natural gas for the operation of the internal combustion engine 10 is stored in a compressed state in a pressurized tank 44 which is located in any convenient part of the vehicle.

Although in FIG. 1 a single pressurized tank 44 is shown, it should be understood that other tanks may be added to the vehicle as required.

In the preferred embodiment of this invention as shown in FIG. 1, natural gas is stored in the tank 44 under high pressure. A fuel line (shown schematically in FIG. 1) connects the tank 44 to pressure regulators 46 and 50 installed either in the engine compartment of the vehicle or in a location adjacent the tank 44. The regulators reduce the pressure of the natural gas before it enters carburetor 16. In the preferred embodiment of the invention, the regulator 46 reduces the tank pressure to about 50 p.s.i. At regulator 50 the pressure is reduced to about 5 inches of water prior to the natural gas being introduced into the carburetor 16.

A solenoid operated shut-off valve 118 is provided in the natural gas intake line 54 in order to interrupt the flow of natural gas to carburetor 16 when it is desired to operate the internal combustion engine 10 on gasoline fuel. An electrical lead 120 extends from the solenoid body and is adapted to be interconnected into the electrical system of the vehicle in a manner to be described with reference to FIG. 2. Again for ease of description, much of the circuitry of this invention has been omitted from FIG. 1.

The solenoid operated shut-off valve 118 is a standard shut-off valve well known to those skilled in the art. The valve functions to interrupt the flow of natural gas to the carburetor when the solenoid is deenergized. Conversely, the natural gas intake line 54 is opened when the solenoid is energized.

Also provided in the natural gas intake line 54 are check valves and filters 48, 52 to insure proper flow of clean gas to the carburetor 16.

A quick disconnect fitting 56 and manual shut-off valve 57 are provided at the pressurized tank 44 so that the tank may be refilled as required. In the compressed natural gas system, it has been found to be more practical to refill the tank in place in the vehicle rather than to change the tank itself. A conveniently located compressor refueling station may be provided for a fleet of vehicles. Natural gas under pressure may be transferred from the compressor refueling station to the tank(s) carried by the vehicle by simply connecting a hose between the quick disconnect fitting of the refueling station (not shown) and the quick disconnect fitting 56 of the tank 44.

Other modes of refueling known to those skilled in the art may be employed for the purpose of refilling tank 44. Thus, fueling vehicles may be used which carry a number of high pressure natural gas tanks. Natural gas may be transferred from the supply tanks of the refueling vehicles to the vehicle being fueled by a simple quick connect of the fueling hose to the tank 44.

Turning now to the carburetors themselves, FIG. 1 shows a schematic representation of the body of carburetor 14. While in the preferred embodiment carburetor 14 is a single barrel carburetor, other carburetor types such as two and four barrel carburetors, should be considered within the scope of this invention.

Since the carburetor 14 is a standard vehicle carburetor well known to those skilled in the art, a further description of the carburetor is believed to be unnecessary. The control apparatus and mechanism for the throttle plate 30 of the carburetor comprises a part of the dual fuel feed apparatus and control of this invention and should not be considered a part of a standard vehicle carburetor.

Similarly, FIG. 1 shows a schematic representation of the body of carburetor 16. Carburetor 16 is a standard natural gas-air mixer such as that manufactured by Impco. The mixer is well known to those skilled in the art. A further description of the mixer or carburetor is believed to be unnecessary.

While the particular structures of carburetors 14, 16 do not form any part of this invention, it should be understood that within the range of operation contemplated for the vehicle, various fuel-air ratios may be employed for gasoline and natural gas as by regulating the respective carburetor setting.

For ease of description, the air intake and cleaner have been omitted from carburetor 14 in FIG. 1. It should be understood, however, that an air intake and cleaner is positioned above the carburetor choke (not shown) at location 58 for the purpose of supplying filtered air to the carburetor.

An air intake and cleaner 60 is shown on carburetor 16 of FIG. 1 for the purpose of supplying filtered air to the carburetor where it is mixed with natural gas prior to being introduced into the intake manifold 12.

The particular design of the air intakes and cleaners for the respective carburetors 14, 16 form no part of this invention as they are well known to those skilled in the art.

THROTTLE PLATE - THROTTLE CONTROL MECHANISM

A description will now be made of the control mechanism associated with each of the throttle plates 30, 42. Since the control mechanism for the throttle plate 30 is identical to the control mechanism for the throttle plate 42, similar reference characters will be used for similar parts in describing the respective control mechanisms with the prime (') superscript used for the reference characters of the various parts of the control mechanism for the throttle plate 42.

The respective throttle plates 30, 42 are mounted on throttle shafts 64, 64' journaled in the respective carburetor bodies. The throttle plates 30, 42 are thus free to rotate about the axis of a respective shaft 64, 64'.

Fixed to one end of throttle shaft 64 is a link 66. A connecting arm 68 has one end thereof received within the end of link 66. Suitable fastening means are used to prevent the end of connecting arm 68 from becoming detached from the link 66. The opposite end of connecting arm 68 is, in turn, received in the end of pivot arm 70. Again, suitable connecting means are used to prevent the connecting arm and pivot arm from separating. Pivot arm 70 is secured to a fixed support by means of pin 72 in a manner such that pivot arm 70 may rotate about the axis of pin 72. A push rod 74 is secured to the opposite end of pivot arm 70. Push rod 74, in turn, has an end 76 slidably received within the body of solenoid 78. Attached to the outer surface of the body of solenoid 78 by means of band clamps 80 is a drive rod 82. The outer end of drive rod 82 is pivotally received in an aperture of yoke arm 84.

Yoke arm 84 extends from a connecting arm 86 pivotally mounted on the vehicle by means of pins 88, 88' received within supporting members 90, 90'.

A driving rod 92 is secured to connecting arm 86 such that as the throttle control 94 is depressed the connecting arm 86 will rotate about the axis of pins 88, 88' causing the yoke arms 84, 84' to rotate about the axis of such pins.

An electrical lead 96 extends from solenoid 78 and is adapted to be interconnected into the electrical circuitry of the vehicle in a manner shown in FIG. 2 as will be described more fully hereafter.

With solenoid 78 energized the drive rod 82 is magnetically coupled to the push rod 74 such that movement of the drive rod will produce corresponding movement of the push rod. With solenoid 78 deenergized, movement of the drive rod 82 will cause the solenoid to slide over the push rod 74 without causing movement of the push rod.

Similar elements to those just described will be found in FIG. 1 in the linkage associated with the throttle plate 42 of carburetor 16. Thus, a link 66', connecting arm 68', pivot arm 70', pin 72', push rod 74', solenoid 78', drive rod 82' and yoke arm 84' coact in a manner similar to the corresponding elements just described to produce movement of the throttle plate 42 upon movement of the throttle control 94.

The operation of the throttle plate of each carburetor will now be briefly described.

A deflection of throttle control 94 by the operator will produce a rotational movement of connecting arm 86 and the attached yoke arms 84, 84'. The yoke arms will, in turn, move drive rods 82, 82' forward. With solenoid 78 energized (as by supplying electrical current to lead 96 in a manner to be described below) a forward movement of the drive rod 82 will, through the magnetic coupling of the solenoid, drive push rod 74 forward. This movement causes the pivot arm 70 to rotate in a counterclockwise direction (as viewed in FIG. 1) moving the connecting arm 68 downwardly and rotating the link 66 in a counterclockwise direction. Rotation of link 66 will cause the throttle plate 30 to move to an open position. The degree to which the throttle plate 30 will be rotated will depend upon the degree of depression of the throttle control 94.

Therefore, energizing of the solenoid 78 produces a direct drive or linkage between the throttle control 94 and the throttle plate 30.

Deenergizing of the solenoid 78 in the throttle plate drive train interrupts the linkage and thereby isolates the throttle plate 30 from the throttle control 94.

In the example given above with the solenoid 78 energized, the solenoid 78' will be placed in a deenergized state by a control circuit to be described more fully hereafter. With solenoid 78' in a deenergized state, the drive rod 82' will not be coupled to the push rod 74' and any motion of drive rod 82' will result in a sliding action of the body of solenoid 78' over the push rod 74'. Push rod 74' will otherwise remain stationary thus causing the throttle plate 42 to remain stationary.

Throttle control 94 is thus capable of moving either or both of the throttle plates 30, 42 depending upon the energizing of the solenoids 78, 78'. As will be described more fully hereafter, since the primary characteristic of the dual fuel system of this invention is to utilized gasoline and natural gas interchangeably utilize not at the same time), the electrical circuitry of the system will provide for energizing of only one of the solenoids 78, 78' at a time.

While the throttle control 94 in the preferred embodiment of this invention of FIG. 1 is shown in the form of a foot pedal to be operated by the vehicle driver, it should be understood that other throttle controls, such as hand operated controls, are considered within the spirit of the invention.

THROTTLE PLATE CONTROL

Attention will now be directed to the throttle plate fuel-air flow control of this invention.

Attached to a free end of throttle shaft 64 of carburetor 14 is link 100 having an extension 102. A spring 104 is attached at one end thereof to the extension 102. The opposite end of the spring is attached to fixed support member 106. The purpose of spring 104 is to bias the throttle plate 30 such that with solenoid 78 deenergized the throttle plate 30 will be in a normally closed position. Thus, throttle plate 30 will act as a tight sealing valve to prevent the flow of air through the carburetor 14 while the vehicle is operated with fuel supplied by the carburetor 16.

Correspondingly, throttle plate 42 of carburetor 16 is biased to a normally closed position by means of spring 104' attached to extension 102' of link 100'. Thus, throttle plate 42 will be moved to a closed position with the solenoid 78' deenergized. In this position, the throttle plate 42 will act as a tight sealing valve to prevent the flow of air through the carburetor 16 while the vehicle is operated with fuel supplied by the carburetor 14.

In addition to the bias spring provided at throttle plate 30, a solenoid 110 is provided at the throttle plate for the purpose of adjusting the throttle plate to an "idle" position when the solenoid 110 is energized. Solenoid 110 has an electrical lead 112 and is provided with a plunger 114 having a free end attached to link 100. It should be understood that the electrical lead 112 is adapted to be interconnected into the wiring harness of the vehicle in a manner shown schematically in FIG. 2 as will be described more fully hereafter.

Plunger 114 is received within the body of solenoid 110 such that when solenoid 110 is energized the plunger will be pulled into the solenoid causing the link 100 to rotate in a manner so as to adjust the throttle plate 30 to an "idle" position.

Similarly, solenoid 110' including a plunger 114' actuates link 100' extending from throttle shaft 64' such that when energized the throttle plate 42 will be rotated from a closed position to an "idle" position.

Briefly reviewing the operation of the throttle plate control mechanism of this invention, the springs 104, 104' function to tightly close a respective throttle plate 30, 42 when a respective solenoid 110, 110' is deenergized. When a respective solenoid 110, 110' is energized, the corresponding throttle plate 30, 42 will be moved by the plunger of the solenoid to an idle position.

FUEL SHUT-OFF CONTROL

As was previously noted, a solenoid operated fuel shut-off valve is installed in each of the respective fuel intake lines. With respect to the gasoline intake line 32 the solenoid operated fuel shut-off valve 40 including an electrical lead 116 is provided for the purpose of shutting off the flow of gasoline to carburetor 14 when the solenoid is deenergized. Similarly, solenoid 118 including electrical lead 120 is provided in the natural gas intake line 54 for the purpose of interrupting the flow of natural gas to the carburetor 16 when the solenoid is deenergized.

FUEL SELECTOR SWITCH

Mounted on the dashboard 124 of the vehicle within the operator's reach is a fuel selector toggle switch 126. Basically, the function of toggle switch 126 is to energize the respective solenoids of the control system of this invention in a manner to permit either gasoline or natural gas operation of the internal combustion engine 10.

In the preferred embodiment of this invention, the toggle switch 126 is a three position switch having a gasoline position, a natural gas position, and a neutral position. It should be pointed out that the neutral position of the toggle switch is optional. Within the spirit of this invention should be considered a two position switch providing for operation of the engine on either gasoline or natural gas without a neutral position.

Extending from the toggle switch 126 as shown in FIG. 1 are electrical leads 128, 130, 132. These leads form a part of the electrical harness of the vehicle and are connected to respective leads of the various solenoids of the system in a manner to now be described with reference to FIG. 2.

ELECTRICAL CONTROL

There are shown in FIG. 2 contact points 128a, 130a, 132a corresponding to the leads 128, 130, 132 of FIG. 1. Toggle 126a of FIG. 2 corresponds to switch 126 of FIG. 1. Also shown in FIG. 2 are leads 96, 96', 116, 120, 112, 112' of the respective solenoids.

GASOLINE OPERATION OF THE ENGINE

Upon movement of toggle 126a (FIG. 2) to contact 128a electrical energy from a suitable source 134 (such as a battery) is supplied to the various solenoids associated with the gasoline carburetor and its associated control mechanism. Thus, solenoid 78 is energized as are solenoids 110 and 40.

Upon energizing of solenoid 78 the drive rod 82 becomes magnetically coupled to the push rod 74 thus providing a direct linkage between the throttle control 94 and the throttle plate 30 of carburetor 14, in a manner previously described.

Energizing of solenoid 40 will cause the fuel supply from the gasoline tank 36 and fuel pump 34 to be opened to the carburetor 14 in a manner previously described.

Also as previously described energizing of solenoid operated shut-off valve 110 will cause the movement of throttle plate 30 to an idle position.

Thus, with toggle 126a abutting contact 128a of FIG. 2, the internal combustion engine 10 may be operated on gasoline fuel by means of the throttle control 94.

While the solenoids 78, 110 and 40 are energized, the complementary solenoids 78', 110' and 118 are deenergized since the circuit between contact 132a and the electrical source 134 is interrupted.

Thus, the flow of natural gas to the carburetor 16 will be stopped by the deenergized solenoid 118. The throttle plate 42 will be biased to tightly closed position by means of spring 104' as previously described (preventing air flow through the carburetor) and the drive rod 82', although actuated by the throttle control 94, will fail to move the push rod 74' due to the deenergized solenoid 78'.

NATURAL GAS OPERATION OF THE ENGINE

With electrical energy from the source 134 provided at the contact 132a by means of toggle 126a, the natural gas carburetor 16 will become energized and the gasoline carburetor 14 will become deenergized. Thus, the natural gas fuel supply to the carburetor 16 will be opened by the energized solenoid 118, the throttle plate 42 will be moved to an idle position by the energized solenoid 110', and the drive rod 82' will become coupled to the push rod 74' by the energized solenoid 78'. Deenergizing of the complementary solenoids 78, 110 and 40 will interrupt the linkage between the drive rod 82 and the push rod 74, will cause the throttle plate 30 to be biased to a closed position and will interrupt the flow of gasoline to the carburetor 16 thus closing down the gasoline system.

The vehicle is thus capable of operating on natural gas by simply effecting a change in position of the toggle 126a from contact 128a to contact 132a.

In a neutral position of the toggle 126a as is shown in FIG. 2 both fuel systems will be inoperative as all solenoids will be deenergized. Thus, both throttle plates will be tightly closed, both fuel supplies shut-off, and the throttle linkage to both of the throttle plates interrupted.

USE OF OTHER FUELS

While the dual fuel feed apparatus and control of this invention has been described as operating with natural gas and gasoline fuels, other fuel types should be considered within the spirit of the invention since any combination of dual fuels may be used. As an example natural gas could be used in combination with liquified natural gas (LNG), propane, or other fuels known to those skilled in the art.

ADVANTAGES OF THE INVENTION

The advantages of a natural gas powered internal combustion engine are numerous.

Natural gas is clean burning with very little or no pollution going into the atmosphere.

A longer engine life may be expected with the use of natural gas since there are no acid or carbon formations. Spark plug life is greatly improved.

Natural gas has an octane rating of 130 (compared to the usual 100 for high test gasoline) and is ideally suited for high compression, high performance engines.

Natural gas is an inherently safe fuel since it is lighter than air. In the event of a leak, natural gas will rise and dissipate harmlessly into the atmosphere. Heavier than air fuels will collect and present a potential fire hazard.

The ignition temperature of natural gas is higher than that of many fuels—1,300° F.

The dual fuel apparatus and control of this invention permits the switching to gasoline fuel if the supply of natural gas is insufficient to meet usual operating needs. In a typical installation in a passenger vehicle eight (8) pressurized tanks may be manifolded together in the luggage compartment of the vehicle in order to provide a range of approximately 160 miles. For normal fleet operation in which a vehicle may be expected to travel approximately 80 miles per day, an adequate supply of compressed gas may be carried by the vehicle for a day's operation with refueling accomplished during the evening.

The invention claimed is:

1. A dual fuel feed apparatus and control for an internal combustion engine comprising in combination:
   a first carburetor having a first throttle plate;
   means for supplying fuel to said first carburetor;
   manifold means for supplying a first fuel-air mixture from said first carburetor to the cylinders of an internal combustion engine;
   a second carburetor having a second throttle plate;
   means for supplying fuel to said second carburetor;
   manifold means for supplying a second fuel-air mixture from said second carburetor to the cylinders of an internal combustion engine independently of said first carburetor;

throttle control means comprising a single throttle control adapted to be regulated by an operator;

a first pair of linkages extending from said throttle control means to respective first and second coupling means;

a second pair of linkages extending respectively from said first and second coupling means to said first and second throttle plates;

selector control means adapted to be regulated by an operator;

said selector control means having a first position and a second position;

means interconnecting said selector control means and said first and second coupling means independently of said first pair of linkages and said second pair of linkages;

whereby:

with said selector control means in a first position;

said first coupling means provides linkage interconnection between said throttle control means and said first throttle plate; and with said selector control means in a second position;

said second coupling means provides linkage interconnection between said throttle control means and said second throttle plate.

2. the invention of claim 1 including:

means to bias said first and second throttle plates to a closed position;

first means to optionally interconnect said first throttle plate with idle positioning means;

second means to optionally interconnect said second throttle plate with idle positioning means;

means interconnecting said selector control means and said first and second means;

whereby:

with said selector control means in a first position;

said first means interconnects said first throttle plate with said idle positioning means to place said first throttle plate in an idle position;

with said selector control means in a second position;

said second means interconnects said second throttle plate with said idle positioning means to place said second throttle plate in an idle position.

3. The invention of claim 2 in which said bias means is a spring.

4. The invention of claim 1 in which said selector control means is a single selector control.

5. The invention of claim 4 in which said single selector control is a switch having at least two positions.

6. The invention of claim 1 in which said first and second coupling means are defined by a solenoid having an electrical lead connected to said selector control means.

7. A dual fuel feed apparatus and control for an internal combustion engine comprising in combination:

a first carburetor having a normally closed first throttle plate;

means for supplying fuel to said first carburetor;

manifold means for supplying a first fuel-air mixture from said first carburetor to the cylinders of an internal combustion engine;

a second carburetor having a normally closed second throttle plate;

means for supplying fuel to said second carburetor;

manifold means for supplying a second fuel-air mixture from said second carburetor to the cylinders of an internal combustion engine independently of said first carburetor;

a foot pedal adapted to be depressed by an operator;

a pair of linkages interconnecting said foot pedal with said first and second throttle plates;

optional coupling means provided in said linkages whereby the linkage to either said first throttle plate or said second throttle plate may be interrupted;

selector control means comprising a single selector control adapted to be regulated by an operator;

said selector control means having a first position and a second position;

control means between said selector control means and said optional coupling means;

means to optionally interconnect said first and second throttle plates with idle positioning means, said idle positioning means being responsive to said selector control means;

whereby:

with said selector control in a first position;

a linkage interconnects said foot pedal with said first throttle plate while said second throttle plate, in a closed position, is isolated from said foot pedal and said first throttle plate is biased to an idle position; and with said selector control in a second position;

a linkage interconnects said foot pedal with said second throttle plate while said first throttle plate, in a closed position, is isolated from said foot pedal and said second throttle plate is biased to an idle position.

8. The invention of claim 7 and including solenoid operated shut-off valves associated with the fuel supply means for said first and second carburetors;

electrical control means between said solenoid operated shut-off valves and said selector control means;

whereby:

with said selector control in a first position;

said solenoid operated shut-off valve at said first carburetor will open permitting a flow of fuel to said first carburetor; and with said selector control in a second position;

said solenoid operated shut-off valve at said second carburetor will open permitting a flow of fuel to said second carburetor.

9. A dual fuel feed apparatus and control for an internal combustion engine comprising in combination:

a first carburetor having a first throttle plate;

means for supplying fuel to said first carburetor;

manifold means for supplying a first fuel-air mixture from said first carburetor to the cylinders of an internal combustion engine;

a second carburetor having a second throttle plate;

means for supplying fuel to said second carburetor;

manifold means for supplying a second fuel-air mixture from said second carburetor to the cylinders of an internal combustion engine independently of said first carburetor;

throttle control means comprising a single throttle control adapted to be regulated by an operator;

first means to optionally interconnect said throttle control and said first throttle plate;

second means to optionally interconnect said throttle control and said second throttle plate;

selector control means adapted to be regulated by an operator;

third means to optionally interconnect said first throttle plate with idle positioning means;

fourth means to optionally interconnect said second throttle plate with idle positioning means;

means interconnecting said selector control means and said third and fourth means;

said idle positioning means comprising a pair of solenoids each having a plunger which causes a respective throttle plate to move to an idle position when a respective solenoid is energized;

whereby:

with said selector control in a first position;

said first means interconnects said throttle control with said first throttle plate and said third means interconnects said first throttle plate with said idle positioning means to place said first throttle plate in an idle position;

with said selector control means in a second position;

said second means interconnects said throttle control with said second throttle plate and said fourth means interconnects said second throttle plate with said idle positioning means to place said second throttle plate in an idle position.

10. A dual fuel feed apparatus and control for an internal combustion engine comprising in combination:
- a first carburetor having a normally closed first throttle plate;
- means for supplying fuel to said first carburetor;
- manifold means for supplying a first fuel-air mixture from said first carburetor to the cylinders of an internal combustion engine;
- a second carburetor having a normally closed second throttle plate;
- means for supplying fuel to said second carburetor;
- manifold means for supplying a second fuel-air mixture from said second carburetor to the cylinders of an internal combustion engine independently of said first carburetor;
- a foot pedal adapted to be depressed by an operator;
- a pair of linkages interconnecting said foot pedal with said first and second throttle plates;
- optional coupling means provided in said linkages whereby the linkage to either said first throttle plate or said second throttle plate may be interrupted;
- selector control means comprising a single selector control adapted to be regulated by an operator;
- said optional coupling means being defined by solenoids interconnected into a respective linkage and having electrical leads connected to said selector control means;
- said selector control means having a first position and a second position;
- whereby:
- with said selector control in a first position:
- a linkage interconnects said foot pedal with said first throttle plate while said second throttle plate, in a closed position, is isolated from said foot pedal; and
- with said selector control in a second position;
- a linkage interconnects said foot pedal with said second throttle plate while said first throttle plate, in a closed position, is isolated from said foot pedal.

11. A dual fuel feed apparatus and control for an internal combustion engine comprising in combination:
- a first carburetor having a normally closed first throttle plate;
- means for supplying fuel to said first carburetor;
- manifold means for supplying a first fuel-air mixture from said first carburetor to the cylinders of an internal combustion engine;
- a second carburetor having a normally closed second throttle plate;
- means for supplying fuel to said second carburetor;
- manifold means for supplying a second fuel-air mixture from said second carburetor to the cylinders of an internal combustion engine independently of said first carburetor;
- a foot pedal adapted to be depressed by an operator;
- a pair of linkages interconnecting said foot pedal with said first and second throttle plates;
- optional coupling means provided in said linkages whereby the linkage to either of said first throttle plate or said second throttle plate may be interrupted;
- selector control means comprising a single selector control adapted to be regulated by an operator;
- said selector control means having a first position and a second position;
- control means between said selector control means and said optional coupling means;
- a first idle positioning solenoid at said first throttle plate;
- a second idle positioning solenoid at said second throttle plate;
- electrical control means between said first and second idle positioning solenoids and said selector control means;
- whereby:
- with said selector control in a first position;
- a linkage interconnects said foot pedal with said first throttle plate while said second throttle plate, in a closed position, is isolated from said foot pedal and said first idle positioning solenoid moves said first throttle plate to an idle position; and
- with said selector control in a second position;
- a linkage interconnects said foot pedal with said second throttle plate while said first throttle plate, in a closed position, is isolated from said foot pedal and said second idle positioning solenoid moves said second throttle plate to an idle position.

12. The invention of claim 11 in which said optional coupling means are defined by solenoids with electrical control means between said solenoids and said selector control means.

* * * * *